Patented Sept. 28, 1937

2,094,213

UNITED STATES PATENT OFFICE 2,094,213

PROCESS FOR THE MANUFACTURE OF POLYMER CARBOXYLIC ACIDS AND DERIVATIVES THEREOF

Karl Hamann, Krefeld-Uerdingen, Germany, assignor to I. G. Farbenindustrie Aktiengesellschaft, Frankfort-on-the-Main, Germany No Drawing. Application April 9, 1936, Serial No. 73,594. In Germany April 25, 1935

16 Claims. (Cl. 260—2)

This invention relates to a process for the manufacture of polymer carboxylic acids and derivatives thereof. The process of the invention consists in polymerizing crotylidene cyanacetic acid compounds in the presence of a free base as a polymerizing agent.

Among the crotylidene cyanacetic acid compounds suitable for the purpose of this invention may be mentioned the salts of crotylidene cyanacetic acid soluble in water, for example the ammonium salt, the alkali metal salts, such as the sodium salt and the potassium salt, the earth alkali metal salts, as for example the calcium salt, strontium salt and barium salt, the salts with organic bases, thus for example with methyl amine, triethyl amine, dipropyl amine and piperidine, the esters of crotylidene cyanacetic acid, such as the methyl ester, ethyl ester, propyl ester, butyl ester, isobutyl ester, amyl ester, esters with the mixtures of alcohols obtainable by the catalytical reduction of carbon monoxide, said alcohols corresponding mainly to the formula $C_4H_9OH$ to $C_7H_{15}OH$, furthermore dodecyl ester, octadecyl ester, esters of unsaturated alcohols, such as oleic alcohol, benzyl ester, glycol ester, glycerine ester, the amides of crotylidene cyanacetic acid, for example crotylidene cyanacetic acid amide itself, crotylidene cyanacetic acid methyl amide, crotylidene cyanacetic acid diethyl amide, etc.

As examples for bases suitable as polymerizing agents may be mentioned alkali metal hydroxides, for example sodium hydroxide, potassium hydroxide, lithium hydroxide, alkali metal carbonates, such as sodium carbonate and potassium carbonate, hydroxides of alkali earth metals, such as calcium hydroxide, strontium hydroxide, barium hydroxide, finally ammonia and organic bases, such as dimethyl amine, trimethyl amine, diethyl amine, piperidine and the like.

When employing bases, such as for example piperidine, diethyl amine, triethyl amine etc., which are soluble in the starting material to be polymerized, the process can be carried out in the absence of a solvent. In other cases a solvent can be employed, in which both the material to be polymerized and the bases are soluble. Such solvents are, for example, when employing alkali metal hydroxide as condensing agents water and ethyl alcohol, when employing for example amines of the kind mentioned before as condensing agents organic solvents, such as alcohols, for example, methyl alcohol, ethyl alcohol, propyl alcohol, esters, such as ethyl acetate, butyl acetate, ethers, such as diethyl ether, glycol ethyl ether, hydrocarbons, such as benzine, benzene, toluene, ligroine, etc.

Alternatively the polymerization can be effected in an emulsion, especially in an aqueous emulsion. In the latter case it is to be recommended to employ an emulsifying agent, such as for example dodecyl trimethyl ammonium hydroxide, alkali metal sulfonates of polyalkylated hydrocarbons, such as the salts of diisopropyl naphthalene sulfonic acid or dibutyl naphthalene sulfonic acid, salts of sulfonated fatty acids and especially the products obtainable by the action of ethylene oxide on hydroxyl derivatives of compounds possessing long aliphatic chains, for example octadecyl alcohol or castor oil.

The alkaline condensing agents to be employed need be present only in relatively small, catalytically acting quantities, for example in an amount of about 0.01 to about 20%, calculated on the amount of the compound to be polymerized. But also greater amounts may be used, the reaction velocity increasing with the amount of condensing agent employed.

The temperature during the reaction may vary to the conditions. I have obtained good results with temperatures above 0°, more particularly with temperatures ranging from about room temperature to about 30°, the upper limit of the reaction temperature and the corresponding pressure being only given by the decomposition point of the components of the reaction mixture.

The invention is illustrated, but not restricted by the following examples; the parts being by weight:

Example 1

10 parts by weight of crotylidene cyanacetic acid are dissolved in 80 parts by weight of normal caustic soda lye. After standing for some ten hours at room temperature the reaction mixture is acidified. The polymerization product precipitates as a resin, which becomes hard and brittle after drying. It is readily soluble in ethyl alcohol.

Example 2

250 parts by weight of crotylidene cyanacetic acid are heated to boiling for six hours with 400 parts by weight of butyl alcohol while passing in hydrogen chloride. Care is taken by distilling off about half the quantity of butyl alcohol added that the water formed during the reaction is removed from the mixture. After diluting with ether, shaking with sodium bicarbonate solution to remove unchanged acid and drying the ethereal mixture over sodium sulfate, the solvent is distilled off and the butyl ester of crotylidene cyanacetic acid is obtained in a yield of about 84% as a colorless liquid possessing a boiling point of 154–156° C. under a pressure of 13 mm.

200 parts by weight of the butyl ester are incorporated with 12 parts by weight of a product obtainable by the action of ethylene oxide on castor oil and emulsified with 200 parts of water. This emulsion is added to 1500 parts by weight of n/3 sodium hydroxide solution. After standing for 12 hours at room temperature the resulting precipitate is centrifuged. The polymerization product is washed and dried. Thus it is obtained in the form of a white product which is readily soluble in organic solvents, such as acetone, and in ethyl, butyl and amyl acetate.

A 4.3% solution of the polymerizate in benzene exhibits an absolute viscosity of 0.20 poise at a temperature of 25° C.

It may be mentioned that the viscosity of the solutions of the polymerizates varies according to the quantity of alkaline condensing agent employed in the polymerization. Thus, for example, the viscosity of a 4.3% solution of polymerized crotylidene cyanacetic acid butyl ester varies from about 0.01 poise to about 0.25 poise at a temperature of 25° C., according as 75% of sodium hydroxide to 5% of sodium hydroxide, calculated on the amount of ester polymerized, are employed.

Example 3

100 parts by weight of the butyl ester obtained in Example 2 are mixed with 0.5–1.5 parts by weight of piperidine. The polymerization proceeds exothermically and commences in a short time. After some days it yields a resinlike polymerization product, which is soluble in xylene and acetone and also in a mixture of alcohol and butyl acetate.

I claim:

1. Process for the manufacture of polymerization products which comprises reacting with an alkaline condensing agent upon a crotylidene cyanacetic acid compound.

2. Process for the manufacture of polymerization products which comprises reacting with an alkaline condensing agent in aqueous solution upon material selected from the group consisting of crotylidene cyanacetic acid and an ester of crotylidene cyanacetic acid.

3. Process for the manufacture of polymerization products which comprises reacting with an alkaline condensing agent upon crotylidene cyanacetic acid.

4. Process for the manufacture of polymerization products which comprises reacting with an alkali in aqueous solution upon crotylidene cyanacetic acid.

5. Process for the manufacture of polymerization products which comprises reacting with normal aqueous caustic soda lye upon crotylidene cyanacetic acid.

6. Process for the manufacture of polymerization products which comprises reacting at room temperature with 80 parts by weight of normal aqueous caustic soda lye upon 10 parts by weight of crotylidene cyanacetic acid.

7. Process for the manufacture of polymerization products which comprises reacting with an alkali in aqueous solution upon an ester of crotylidene cyanacetic acid.

8. Process for the manufacture of polymerization products which comprises reacting with an alkaline condensing agent upon crotylidene cyanacetic acid butyl ester.

9. Process for the manufacture of polymerization products which comprises reacting with an alkali upon crotylidene cyanacetic acid butyl ester.

10. Process for the manufacture of polymerization products which comprises reacting with an alkali in aqueous solution upon crotylidene cyanacetic acid butyl ester.

11. Process which comprises reacting at room temperature with 1500 parts by weight of n/3 sodium hydroxide solution upon an emulsion of 200 parts by weight of crotylidene cyanacetic acid butyl ester incorporated with 12 parts by weight of a product obtainable by the action of ethylene oxide on castor oil and 200 parts of water.

12. Polymerized crotylidene cyanacetic acid, said polymerizate being soluble in ethyl alcohol.

13. A polymerized derivative of crotylidene cyanacetic acid.

14. A polymerized ester of crotylidene cyanacetic acid.

15. Polymerized butyl ester of crotylidene cyanacetic acid, said polymerizate being readily soluble in acetone, ethyl, butyl or amyl acetate, a 4.3% solution of the polymerizate in benzene exhibiting an absolute viscosity of about 0.01 poise to about 0.25 poise.

16. Polymerized butyl ester of crotylidene cyanacetic acid, said polymerizate being readily soluble in acetone, ethyl, butyl or amyl acetate, a 4.3% solution of the polymerizate in benzene exhibiting an absolute viscosity of 0.20 poise at a temperature of 25° C.

KARL HAMANN.